United States Patent Office 3,445,754
Patented May 20, 1969

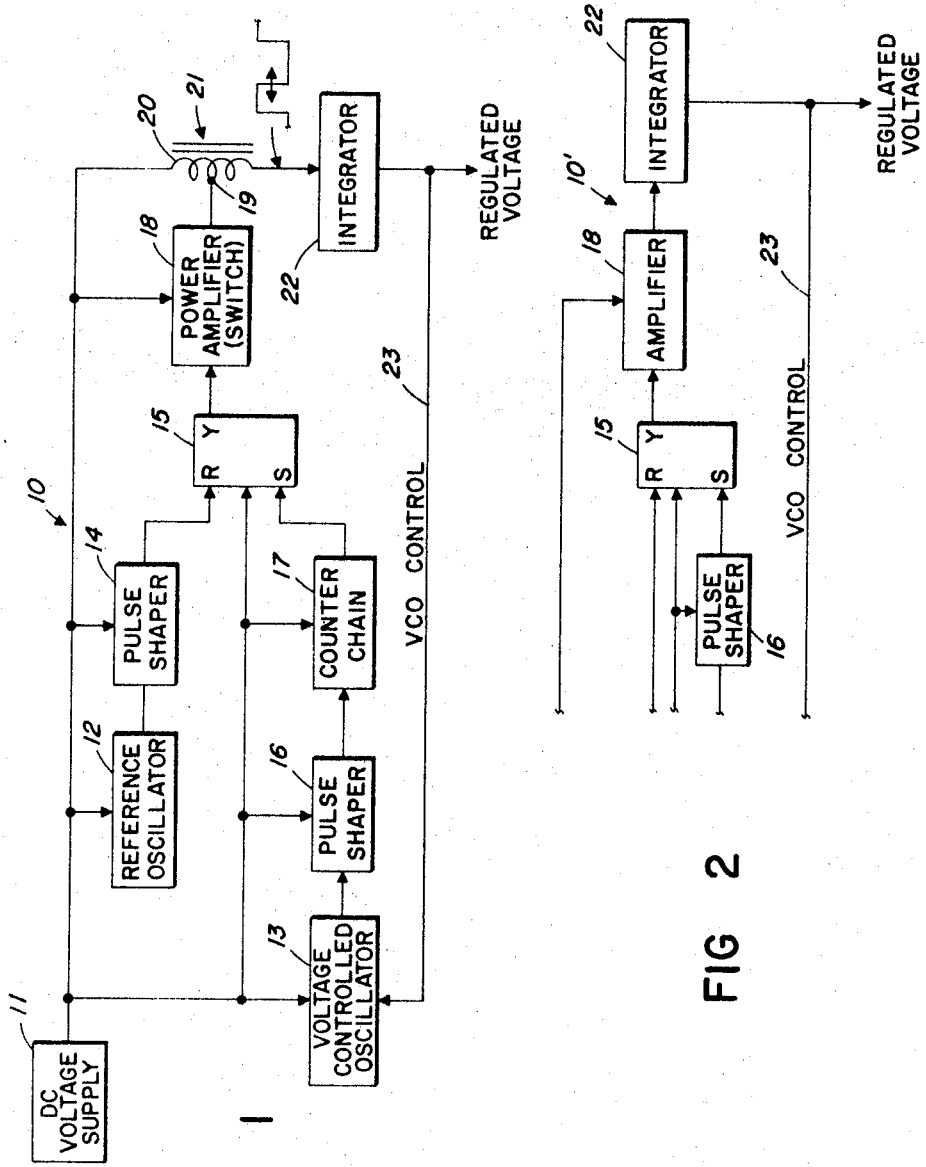

3,445,754
REFERENCE OSCILLATOR AND VCO LOOP
CONTROLLED DC REGULATOR
Samuel L. Broadhead, Jr., 9800 Wallwood Road, SE.,
Huntsville, Ala. 35803
Filed Dec. 9, 1966, Ser. No. 600,606
Int. Cl. H02p 13/10
U.S. Cl. 323—45   7 Claims

ABSTRACT OF THE DISCLOSURE

A DC voltage regulator with output regulation provided through a feedback loop from the output connected as a DC control input to a DC voltage controlled oscillator for adjusting AC output phase thereof relative to the AC signal of a reference oscillator with both resulting AC signals being applied to a flip-flop for control thereby of the energy content in the flip-flop signal output and in the signal being integrated to a DC output with the desired degree of DC voltage regulation.

This invention relates in general to voltage regulators, and in particular, to a voltage regulator using a voltage controlled oscillator phase locked to a reference oscillator and with the stability of the output regulated voltage dependent substantially only upon the frequency stabilities of the reference and voltage controlled oscillators.

Many voltage regulators have regulation accuracies in the range of, typically, 4 to 6 percent, improvement of which is acquired generally at the expense of complexity and increased cost. Further, many voltage regulators are designed to provide specific predetermined regulated voltages without any provision for adjustment of the regulated voltage, a feature that, if provided, proves particularly useful in some voltage regulator applications. In some other applications it is quite advantageous if a regulated voltage output of a voltage regulator may be regulated up as well as down relative to a DC supply voltage.

It is, therefore, a principal object of this invention to provide a voltage regulator with regulation accuracies as good as approximately one percent readily attainable.

A further object is to provide such a voltage regulator wherein regulation accuracy is determined by oscillator frequency accuracies.

Another object of such a voltage regulator is to provide for relatively simple adjustment of the regulated output voltage.

Features of this invention useful in accomplishing the above objects include, in a voltage regulator using a voltage controlled oscillator phase locked to a reference oscillator, regulation accuracies as good as the approximately one percent frequency accuracies readily attainable with the oscillators used in the voltage regulator, and with these voltage regulation accuracies being determined primarily by the oscillator frequency accuracies. The improved voltage regulators utilize a reference oscillator and a voltage controlled oscillator developing signals applied as inputs to the set and reset terminals of a standard flip-flop circuit, the output of which is applied to a power amplifier developing a square wave output at a frequency determined by the oscillators. The pulse width of the square wave output of the power amplifier varies as determined by the output of the flip-flop circuit and in turn the phase relation of the oscillator signal inputs to the flip-flop circuit. The resulting variable pulse width signal is passed to an integrator circuit developing the regulated output voltage that is also applied back as a controlling voltage input to the voltage controlled oscillator of the voltage regulator. A further feature in one embodiment is an autotransformer connected between the DC voltage supply and an integrator circuit with the square wave output of the power amplifier fed to a tap of the autotransformer coil.

Specific embodiments representing what are presently regarded as the best modes of carrying out the invention are illustrated in the accompanying drawing.

In the drawing:

FIGURE 1 represents a voltage regulator using a voltage controlled oscillator phase locked to a reference oscillator with both feeding a standard flip-flop, the amplified square wave output of which is fed to a coil tap of an autotransformer for regulation up or down of the regulated output voltage passed through an integrator circuit; and FIGURE 2 a partial schematic of a similar voltage regulator without an autotransformer and without the regulation up capabilities of the FIGURE 1 embodiment.

Referring to the drawing:

The voltage regulator 10, of FIGURE 1, is shown to include a DC voltage supply 11 connected to both a reference oscillator 12 and a voltage controlled oscillator 13. The output of the reference oscillator 12 is passed as an input to a pulse shaper 14, also supplied with voltage from the DC voltage supply 11, and the output of the pulse shaper 14 is passed as an input to the reset circuit terminal R of a standard flip-flop circuit 15, also connected to the DC voltage supply 11. The output of voltage controlled oscillator 13 is passed as an input to a pulse shaper circuit 16, also supplied with voltage from the DC voltage supply 11. The output of the pulse shaper 16 is passed as an input to a counter chain circuit 17, having a connection to the DC voltage supply 11, and having an output connected as an input to the set circuit terminal S of the flip-flop circuit 15. It should be noted that counter chain circuit 17 is employed in the voltage regulator 10 to divide the frequency input thereto by a factor such that its output is at a frequency equal to the frequency of reference oscillator 12, with the voltage controlled oscillator 13 frequency being set to and controlled to a multiple of the frequency of reference oscillator 12. If voltage controlled oscillator 13 should be set and controlled to a frequency equal to the frequency of reference oscillator 12, then, obviousy, any need for counter chain circuit 17 would be eliminated and this subcircuit removed from the voltage regulator 10.

An output of the flip-flop circuit 15, indicated as being a Y output, is applied as an input to a power amplifier-switch circuit 18, of conventional construction, also connected to the DC voltage supply 11. The output of power amplifier-switch circuit 18 is fed to tap 19 of a coil 20 of autotransformer 21, one end of which is connected to the DC voltage supply 11 and the other end of which is connected as the signal path input to integrator circuit 22. The output of integrator circuit 22 is the regulated voltage output of the voltage regulator 10 available for use as required and the VCO control line 23 applies this regulated voltage back as the controlling voltage input to the voltage controlled oscillator 13.

During operation of the voltage regulator 10, the phasing and shift in the phasing between the frequency signal inputs applied to the set and reset input terminals of the flip-flop determine the ultimate energy content in the voltage signal applied as an input to integrator circuit 22 such as indicated by the square waveform shown for the line connection between the autotransformer 21 and the input of integrator circuit 22. This is with the width of the square waveform subject to variance in accordance with the shift in the phase relationship in the frequency signal inputs to the flip-flop circuit 15. Obviously, as the energy content of the waveform applied to the integrator circuit 22 is varied, the regulated output voltage correspondingly varies and with this immediately applied back as the controlling voltage input to the voltage controlled oscillator 13 thereby immediately readjusting the phase relationship in a phase locking action between the frequency signal inputs to the flip-flop 15. This provides for a voltage regulator regulation accuracy to within the approximately one percent accuracy generally and readily obtainable with oscillator frequency accuracies, and with the voltage regulation accuracy primarily determined by these oscillator frequency accuracies.

The pulse shaper circuits 14 and 16 are provided for shaping the oscillator frequency signals to more square wave-like frequency signals in order to insure more positive and correct set and reset action of flip-flop 15 in operation of the voltage regulator 10. The pulse shaping action of the signals provided by the circuits 14 and 16 provides optimized more dependable operational action of the flip-flop 15. Oscillators 12 and 13 may be provided that provide such an output that pulse shaper circuits 14 and 16 may not be required for some embodiments. Further, a power amplifier-switch circuit 18 is provided having rather well-defined predetermined lower and upper voltage limits for the output signal waveform, and with a switching action between the limits to optimize square wave shape in switching action between one voltage limit and the other. This provides for energy content of the waveform output from the power amplifier-switch circuit 18 being closely controlled by variance of the width of the pulses of the waveform as determined by the signal output of the flip-flop circuit 15 and the phase relation between the two oscillator signals as applied to the set and reset inputs of the flip-flop circuit 15. Here again, the power amplifier-switch circuit 18 may be omitted in some embodiments where the signal outputs of the oscillators, and of the flip-flop circuit 15, are of an adequate power level for developing a regulated voltage output from the voltage regulator 10, but it should be recognized that such an embodiment would be useable only for a regulated voltage at relatively low power levels. It should be noted further, that with the connection of the autotransformer 21 between the DC voltage supply 11 and the integrator 22 and with the power amplified waveform input thereto being applied at tap 19 of coil 20 a voltage regulator is provided that may be regulated up as well as down relative to the DC supply voltage.

Referring now to the embodiment of FIGURE 2, a voltage regulator 10' is provided which is not capable of being regulated up as with the embodiment of FIGURE 1, since the output of the power amplifier-switch circuit 18 is applied directly as an input to the integrator circuit 22 for developing the resulting regulated voltage output. Furthermore, in this embodiment wherein components providing substantially the same function as in the embodiment of FIGURE 1 are numbered the same, no counter chain circuit 17 is provided as was provided in the embodiment of FIGURE 1, and that therefore, the voltage controlled oscillator 13 of this embodiment must be set to and controlled in phase locking action to the same frequency as the frequency of the reference oscillator 12. The operational action of the other components of this embodiment are substantially the same, in developing the ultimate regulated voltage output, as in the embodiment of FIGURE 1 except for the exceptions enumerated immediately hereinabove.

Whereas this invention is herein illustrated and described with respect to specific embodiments thereof, it should be realized that various changes may be made without departing from essential contributions to the art made by the teachings hereof.

I claim:
1. In a DC voltage regulator, a DC voltage supply; a reference frequency source; a DC voltage controlled oscillator; a flip-flop circuit having a set input connection, a reset input connection, and with the reference frequency source and said DC voltage controlled oscillator connected to signal input connections of the flip-flop circuit, a DC voltage supply connection, and an output connection; a signal integrator connected to the output connection of said flip-flop circuit, and having a regulated DC voltage output; and connection of said regulated DC voltage output of the signal integrator as a DC voltage controlling input to said DC voltage controlled oscillator.

2. The DC voltage regulator of claim 1, wherein a power amplifier is provided in the connection between the output connection of said flip-flop circuit and said signal integrator.

3. The DC voltage regulator of claim 2, wherein said power amplifier is a power amplifier with a voltage level switching action.

4. The DC voltage regulator of claim 2, wherein an autotransformer is also provided in the connection between the output connection of the flip-flop circuit and said signal integrator; and with the autotransformer also connected to said DC voltage supply.

5. The DC voltage regulator of claim 1, wherein an autotransformer is provided in the connection between the output connection of the flip-flop circuit and said signal integrator; and with the autotransformer also connected to said DC voltage supply.

6. The DC voltage regulator of claim 1 wherein said reference frequency source is a reference oscillator connected to a signal input connection of said flip-flop circuit; a first pulse shaper circuit is included in the connection between said reference oscillator and the flip-flop circuit; and a second pulse shaper circuit is included in the connection between said DC voltage controlled oscillator and the flip-flop circuit.

7. The DC voltage regulator of claim 1, wherein a counter chain circuit is provided in the connection between the said DC voltage controlled oscillator and an input connection of said flip-flop circuit with the counter chain circuit having a predetermined division factor; and with the DC voltage controlled oscillator set for and DC voltage controlled to a frequency multiple of the frequency of said reference frequency source by a multiplication factor equal to the predetermined division factor of the counter chain circuit.

References Cited

UNITED STATES PATENTS

| | | |
|---|---|---|
| 3,155,838 | 11/1964 | Brahm. |
| 3,164,769 | 1/1965 | Anderson. |
| 3,226,630 | 12/1965 | Lampke. |
| 3,323,037 | 5/1967 | Doss. |
| 3,341,765 | 9/1967 | Rogers et al. _____ 321—2 |
| 3,381,202 | 4/1968 | Loucks et al. _____ 321—2 |

JOHN F. COUCH, *Primary Examiner.*

A. D. PELLINEN, *Assistant Examiner.*

U.S. Cl. X.R.

321—2, 18; 323—16